Oct. 22, 1957 K. DYK ET AL 2,810,444
DETERMINING OPTIMUM CONDITIONS FOR SEISMIC SURVEYING
Filed July 15, 1954 4 Sheets-Sheet 1

INVENTORS
KARL DYK
BY MOSES B. WIDESS
Newell Pottoff
ATTORNEY

Oct. 22, 1957  K. DYK ET AL  2,810,444
DETERMINING OPTIMUM CONDITIONS FOR SEISMIC SURVEYING
Filed July 15, 1954  4 Sheets-Sheet 2

INVENTORS
KARL DYK
MOSES B. WIDESS
BY
*Newell Pottorf*
ATTORNEY

Oct. 22, 1957　　　K. DYK ET AL　　　2,810,444
DETERMINING OPTIMUM CONDITIONS FOR SEISMIC SURVEYING
Filed July 15, 1954　　　　　　　　　　　　4 Sheets-Sheet 3

INVENTORS
KARL DYK
BY MOSES B. WIDESS
ATTORNEY

United States Patent Office 2,810,444
Patented Oct. 22, 1957

2,810,444

DETERMINING OPTIMUM CONDITIONS FOR SEISMIC SURVEYING

Karl Dyk and Moses B. Widess, Tulsa, Okla., assignors to Pan American Petroleum Corporation, a corporation of Delaware Application July 15, 1954, Serial No. 443,616

7 Claims. (Cl. 181—.5)

This invention relates to seismic geophysical surveying and is directed particularly to a method and apparatus for determining when the conditions of generation and reception of seismic waves are optimum for any given location or area. More specifically, it is directed to a testing procedure and arrangement for determining the optimum spacing and layout of seismometers and/or shot points in areas where prior experience or techniques are lacking or inadequate. Also, the invention is applicable during routine seismic surveying operations to check whether the conditions being used are satisfactory or are susceptible of improvement.

In seismic geophysical surveying, it has long been the practice to use multiple seismometers laid out in various spacings and patterns on the ground surface to receive the seismic waves reflected from subsurface interfaces. More recently multiple shot holes have come into use in an analogous way, the purpose of both such multiple seismometers and multiple shot holes being to obtain more or less self-cancellation of undesired seismic surface waves, while the reflected seismic waves add together in phase and reinforce each other.

Where the undesired waves are few in number or simple in character, it has sometimes been possible to design spreads of seismometers or patterns of shot holes which produce a maximum cancellation effect. Usually, however, the undesired waves and noise are of such random character that only by an extensive series of empirical or trial-and-error tests, coupled with personal experience and judgment, can optimum spacings or patterns of shot holes and seismometers be discovered. Even then, there has been no quantitative way of measuring the effectiveness of a chosen shot-hole or seismometer arrangement, or of checking or monitoring its effectiveness during routine operations at locations in a prospecting area other than the test location.

It is accordingly a primary object of our invention to provide a systematic procedure for evaluating the conditions of seismic surveying to arrive at optimum values of the wave generation and reception variables, including particularly a method and apparatus for verifying or checking more or less quantitatively the effectiveness of the values arrived at. Another object is to provide a method and apparatus for determining the optimum conditions for seismic surveying with minimum time and expense, and with minimum requirements for personal experience and judgment. A more specific object is to provide a monitoring or verifying arrangement of seismometers or shot holes for checking optimum seismic surveying conditions at any given location. A still further object is to provide a method and apparatus for evaluating seismic noise conditions at any location. Other and further objects, uses, and advantages of the invention will become apparent as the description proceeds.

Stated briefly, our invention comprises a test procedure wherein variables of spacing and pattern of shot holes or seismometers are first studied in a preliminary way to arrive at tentative optimum values. Then these values are used in laying out each of two patterns or groups of seismometers or shot holes. One of these groups or patterns is interspersed into or interlaced within the other, and two record traces are made, one representing each group or pattern, in a manner which permits ready comparison. If the two recorded traces are found upon comparison to be substantially identical, this means that the spacing of the group or pattern under study is satisfactory, and no additional information or cancelling of unwanted seismic noise would occur if the spacing were reduced, for example, by using both groups of points to make a single trace.

While the identity of traces thus compared is a kind of negative indication meaning that the chosen and tested spacing is not too large, it leaves open the possibility that the spacing could be increased. On the contrary, a lack of identity between two traces is a positive indication that too large a spacing has been used. In routine operations therefore, at least one such interlaced group of seismometers is preferably included in the seismometer groups regularly laid out, and one additional record trace is made for comparison purposes to ascertain whether the spacing employed is or is not too large for the particular shooting location. Thus, if the results are poor, and the spacing used is indicated to be too large, improvement is assured upon re-shooting the location with a smaller spacing.

This will be better understood by reference to the detailed description to follow, taken with the accompanying drawings forming a part of this application. In these drawings.

In the description to follow, we shall describe not only the spreads or hole patterns comprising our invention but also the entire series of tests performed upon entering an area where seismic surveying conditions are unknown or where improved results are desired.

First to be evaluated are the ground coupling conditions. For this purpose seismometer planting tests are made using very closely spaced seismometers set on the ground surface, for example, one foot apart, each seismometer being connected to a separate recording channel and oscillograph trace. Seismic waves created in any desired manner and by means well known in the art are picked up by these seismometers which, in view of their close spacing, should produce substantially identical adjacent traces. The planting technique is varied, as by using different degrees of burial of these seismometers, the use of spikes, and various types of wet and dry planting, until satisfactory matching of the recorded traces is achieved. If there is any reason for expecting the planting requirements to differ at different locations, these planting tests may be repeated at one or more other places in an area. The planting technique found to be satisfactory by these tests is used in subsequent testing.

Next to be performed are wave tests using longer spacings of seismometers than the planting test, the seismometers being spaced either in line with the shot point or at right angles thereto. By the term "in line" in this specification is meant, not only arrangements where the shot point lies exactly on or close to the straight line passing through the seismometers spread, but also arrangements where the shot point is offset from the spread line, provided the amount of offset is small compared to the spread length or separation from the shot point, or both. Thus, as in Figure 1, a seismometer spread 10, consisting of the seismometers $S_1$—$S_{12}$ is laid out along the ground surface at an appropriate distance from a shot point 11 and aligned with it. Each seismometer of spread 10 is connected to a separate trace of a multiple-channel recorder 12, which may be of any conventional type. The seismometers are spaced along spread 10 at, say, ten-foot intervals, or at any other interval that may be appropriate if prior knowledge of the prospecting area so indicates. Charges are detonated at shot point 11, and records are made by recorder 12 in a manner conventional in seismic geophysical surveying.

For each shot the record so made is examined trace by trace. Each trace, representing one seismometer, is compared in turn with every other trace in increasing order of distance. As the time phase from trace to trace varies much more rapidly for noise than for the desired seismic reflection waves, these comparisons result in choice of an average in-line spacing of seismometers which should be effective to produce cancellation of noise waves.

Figure 1:
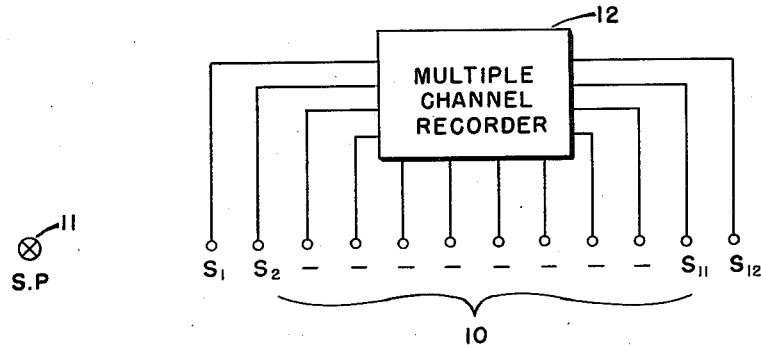
Figures 1 and 2 are plan views of seismometer spreads used in conducting wave tests.
Figure 2:
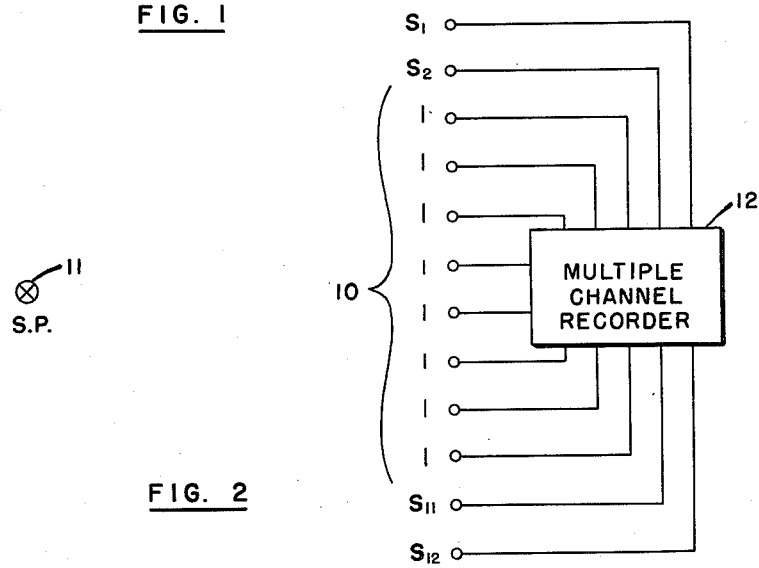

By use of the same procedure, with spread 10 oriented as shown in Figure 2, at right angles to its orientation in Figure 1, records are made, and trace-by-trace comparisons are carried out, for determining a noise-cancelling seismometer spacing in the crosswise direction.

The next step preferably carried out is to verify the in-line seismometer spacing by the novel spread of our invention, which may be termed a "saturation" test or spread. Its purpose is to show whether the interval of ground covered by any seismometer group is "saturated," or whether an even greater "density" of seismometers, i. e., more closely spaced, would improve the results, the over-all group dimensions remaining the same.

Figure 3:
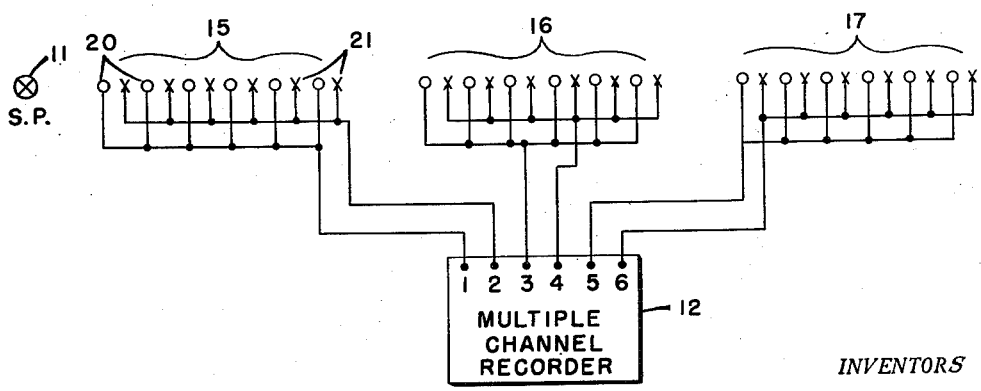
Figure 3 is a plan view a seismometer spread used for vertifying the choice of spacing made according to Figure 1.

This is shown in Figure 3. Three or more seismometer groups, 15, 16, and 17, are laid out in line with the shot point 11. While the linear groups may be immediately adjacent each other, they are preferably somewhat more widely spaced so as to cover about the range of distances from the shot point 11 likely to be used in normal shooting. Each seismometer group such as group 15 contains, for example, from six to twelve seismometers connected together for recording on a single trace. The individual seismometers 20 of group 15 shown on the drawing as small circles, and hereinafter designated "o seismometers," thus form a group of six which is connected to trace #1 of multiple-channel recorder 12. Interlaced within group 15 are six additional seismometers 21 with the same spacing as the seismometers 20 but placed midway between the latter seismometers. The seismometers 21, shown as small x's on the drawing, are hereinafter called "x seismometers." The six x seismometers 21 thus are connected together and to channel and trace #2 of recorder 12. Similarly seismometer group 16 consists of six o seismometers connected to channel and trace #3, and six x seismometers, spaced intermediate between the o seismometers, connected together and to trace #4. Group 17 consists similarly of six o seismometers connected to trace #5 and six x seismometers connected to trace #6.

Shots are then taken at shot point 11, and records are made with the interlaced groups thus recorded on adjacent traces. Comparisons of adjacent traces are then made, wiggle-for-wiggle of the visible oscillographic traces, especially in the portions of the record of greatest interest. If these comparisons show that the variations of character and differences of phase between the compared traces, i. e., traces #1 and #2, are minor, then for all practical purposes saturation has been reached by the spacing of o seismometers 20, and no further benefit would result from a closer spacing. In other words, no improvement would result from recording all of the o and x seismometers together on a single trace.

If, on the other hand, the traces compared are significantly different, then the linear seismometer spacing of the o or x seismometers is too large, and improvement should result from use of a smaller spacing. In other words, a better signal-to-noise ratio would result from the twelve o and x seismometers of traces #1 and #2 being combined into a single trace. If it is thus shown that the spacing of seismometers 20 in group 15 is too large, then this spacing is reduced, and the verification test using o and x seismometers on adjacent traces at the new smaller spacing is repeated until the differences between adjacent traces of interlaced groups are minor. In some cases where reflections are visible across the traces of a record, the differences seen in a reflection in going from trace to trace of adjacent, but not interlaced, groups may be used as a criterion. If the interlaced trace differences are as much as the trace-to-trace reflection differences, the spacing used is clearly too large. If the interlaced trace differences are very much less than the trace-to-trace reflection differences, the spacing used is satisfactory, and the reflection would not be materially improved by compounding the interlaced traces.

In order to check the cross-line spacing determined in Figure 2, a verification spread exactly like that of Figure 3 is laid out, except the line of groups 15, 16, and 17 is at right angles to its orientation in Figure 3, in exactly the same way the spread of Figure 2 is turned relative to the spread of Figure 1. Records are made, and adjacent traces of interspersed seismometer groups using the cross-line spacing are compared in the same way to determine whether the spacing is satisfactory or too large.

Figure 4:
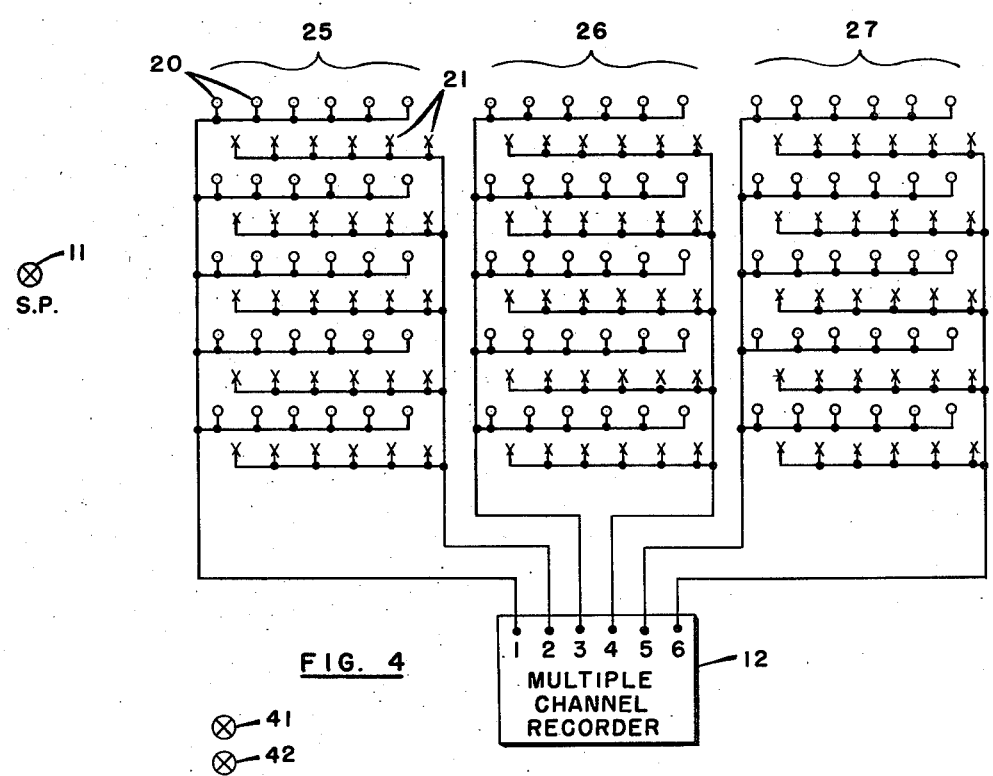
Figure 4 is an areal seismometer spread arranged for further verifying previously chosen seismometer spacing relations.

Following this, both of the in-line and the cross-line spacings so determined are simultaneously tested or verified using an areal seismometer array as shown in Figure 4. At least three rectangular areal groups 25, 26, and 27 are laid out at different distances from the shot point 11, the three groups preferably covering parts of the normal range of distances from shot point 11 to be used in surveying. Within each group, such as the group 25, the o seismometers 20 are laid out in parallel rows aligned with the shot point, the spacing in each row being the above-determined in-line spacing. The space between the rows of o seismometers is the above-determined cross-line spacing. All of the o seismometers of group 25 are connected together and fed to trace #1 of multiple channel recorder 12.

Within each group such as 25, the x seismometers 21 are laid out in rows with the rows midway between the rows of o seismometers. In addition, each x seismometer may also be shifted toward or away from shot point 11 by about half of the in-line seismometer spacing, so that each x seismometer is approximately at the center of the rectangle defined by the four o seismometers nearest to it. All of the x seismometers 21 are connected together and fed to trace #2 of recorder 12. Similarly, the o and x seismometers of group 26 are connected together and respectively to adjacent traces #3 and #4 of recorder 12, while for group 27, they are connected to adjacent traces #5 and #6.

As before, records are made by detonating charges at shot point 11, and the traces of interlaced groups are compared, substantial identity of the traces indicating that the seismometer spacing is satisfactory, whereas substantial differences show the need for using shorter spacing within each group 25, 26, and 27.

An effort is made to obtain the desired reflections with the arrangements of Figure 4. If this technique fails to produce satisfactory reflections, the size of the groups 25, 26, and 27 may be enlarged without changing the spacing relations of the seismometers within the group. This increase in size or areal extent of the group, however, is limited by changes of weathering and elevation within each group, as well as the normal moveout of reflections from one edge of the group to the other, which, in the absence of artificial time-delay or compensation devices, must not be allowed to become so great as to alter the reflection character appreciably due to wave-interference effects.

Of course, to the extent that the information provided by the tests prior to the test of Figure 4 is already known or can be estimated, any or all of such prior tests can be omitted and the latter test relied on alone. These tests generally conclude the portion of the testing procedure devoted to varying the seismometer arrangements.

Figure 5:
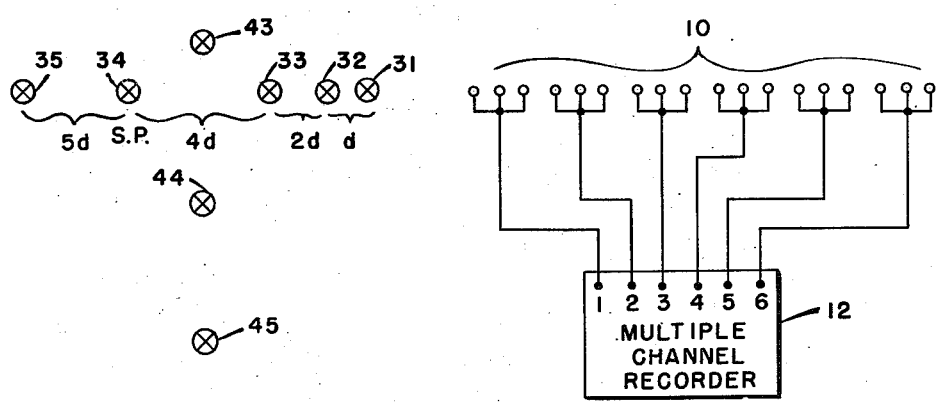
Figure 5 is a plan view of shot-hole and seismometer spread arrangements for determining shot-hole spacings in a hole pattern.

As the use of multiple shot holes is in many cases analogous to the use of multiple seismometers to obtain cancellation of interfering waves, or otherwise improve the seismic signal-to-noise ratio, the next subject for investigation is the spacing of shot holes to be used in multiple-hole patterns. An arrangement for this purpose is shown in Figure 5. Any convenient arrangement or spread 10 of seismometers is laid out on the ground and connected to recorder 12, although preferably the spread is one that is to be used ultimately in production work. At some distance from the location of spread 10 a line of shot holes 31 to 35 is drilled with various spacings of the holes from hole 31. Records are then made in the conventional way, at least one recording being taken by shooting in each of the shot holes 31 to 35. Corresponding traces of these records are then compared. For example, trace #1 of the record obtained by shooting in hole 31 is compared with trace #1 of the record made by shooting in hole 32. Similarly traces #2 of the two records are inter-compared, as are the remaining traces. Next, comparison is made of corresponding traces of records obtained from shot holes 32 and 33. Following this, comparison is made between corresponding traces of records made using holes 31 and 33, and so on until each of the records made by shooting in holes 31 to 35, inclusive, has been compared with the record made in every other hole.

The spacing of these holes is such that an average separation between two holes can be ascertained where the unwanted noise produced by the shots is significantly different in character and phase. For example, by using progressively larger spacings in the series of holes 31 to 35, such as the respective intervals $d$, $2d$, $4d$, and $5d$, a small number of holes can provide a greater number of distance comparisons. Thus, these five holes provide comparisons of the following distances: $d$, $2d$, $3d$, $4d$, $5d$, $6d$, $7d$, $9d$, $11d$, and $12d$, where $d$ is any desired unit distance such as five, ten, or twenty feet. From the comparisons so made, an average value of hole spacing can be arrived at to produce significant cancellation of shot-created noises.

A similar investigation is carried out for a line of holes at right angles to the spread 10, using holes 41 to 45, inclusive, and comparing corresponding traces of records made in each hole with every other. Again, by comparing traces for holes with progressively greater separations, an average hole separation can be deduced, for holes aligned perpendicularly to the seismometer spread, to produce maximum cancellation of unwanted seismic waves.

Figure 6:
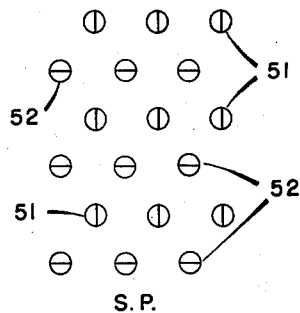
Figure 6 is a plan view of a seismometer spread and shot-hole pattern for verifying the shot-hole spacings chosen according to Figure 5.
Figure 6:
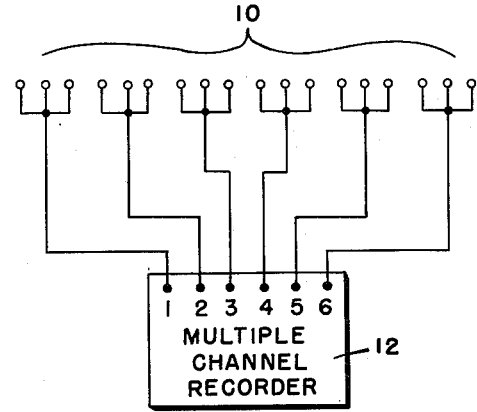

Verification or saturation testing of the hole spacings so determined is next carried out as shown in Figure 6. Two rectangular hole patterns are drilled utilizing the in-line and cross-line hole spacings determined according to Figure 5. One pattern consisting of the holes 51, each identified by a circle with a vertical line, is interlaced with an exactly similar pattern of holes 52, each identified by a circle with a horizontal line. Using seismometer spread 10 at an appropriate distance, the pattern of holes 51 is shot by setting off charges in all of the holes 51 simultaneously to make a first record. Following this, charges are detonated simultaneously in the pattern of holes 52, and another record is made.

These two records are then compared to ascertain the validity of the hole spacing pattern chosen. As with the seismometer spacing tests, substantial identity of corresponding traces on the two records indicates that the hole pattern spacing is satisfactory, while substantial differences indicate that the spacing within the pattern could be made smaller with improved results. In other words, substantial identity of the records made with spread 10 using the two patterns 51 and 52, shows that one of the patterns could have been omitted without loss of seismic data.

Figure 7:
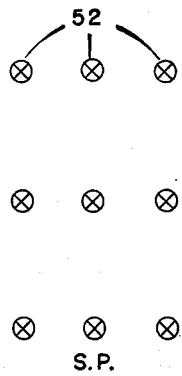
Figure 7 is a plan view of an arrangement of shot holes and a seismometer spread used for routine shooting, including an interlaced seismometer group for monitoring the spacing relations of the seismometer spread.
Figure 7:
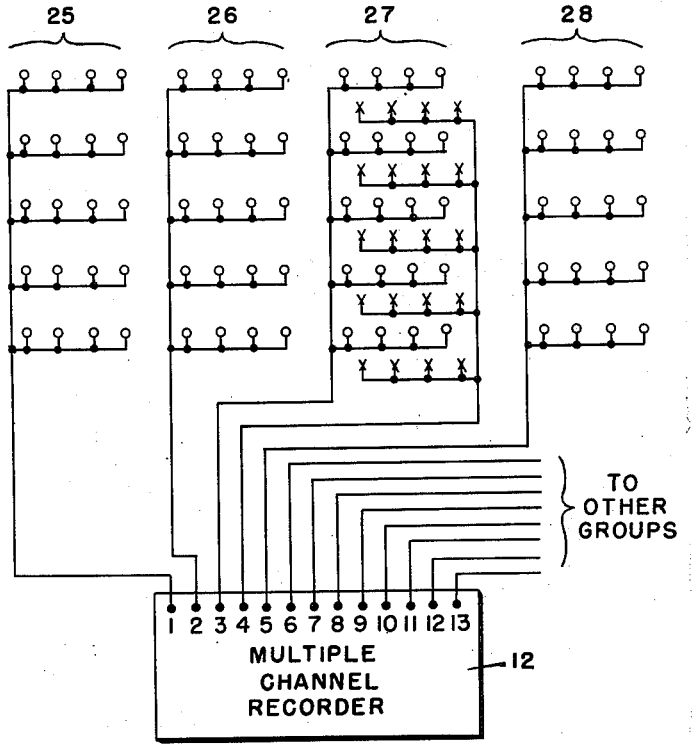

One way of utilizing our invention in routine shooting is shown in Figure 7. The shot point may comprise one or more holes 52 alone or arranged in a pattern. The spread 10 may consist of areal groups of $o$ seismometers 25, 26, 27, 28 and so on, or any other grouping of seismometers desired, such as linear groups. In order to determine whether the spacing of seismometers within these groups is appropriate for the particular location, a similar group of $x$ seismometers is interlaced in the $o$ seismometers of group 27, and the two interlaced groups are recorded on adjacent traces #3 and #4 of the recorder 12. Comparison of traces #3 and #4 in the same manner as traces of the interlaced groups in Figure 4 then indicates whether the spacing within the group 27, and presumably also within the other groups 25, 26, 28, etc., is appropriate or needs to be made smaller. As noted before, there is no indication that the spacing used is too short, as this would mean only that fewer seismometers would have given the same results. No seismic data are lost by using more seismometers or smaller spacings than are necessary for any particular location.

Figure 8:
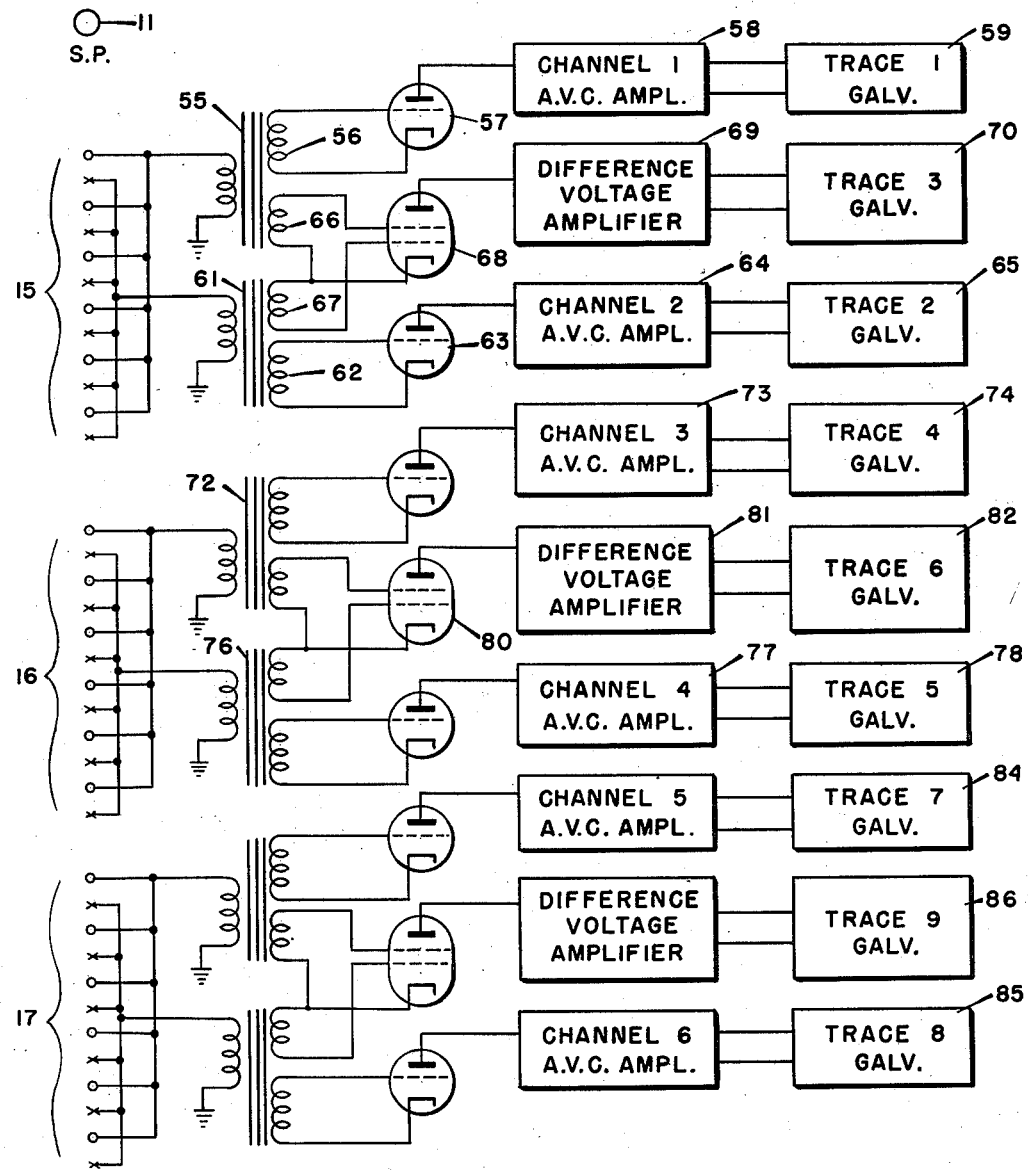
Figure 8 is a plan view of a seismometer spread arrangement, combined with a wiring diagram which is partially diagrammatic, for electrically comparing recorded traces of interlaced seismometer groups.

In the foregoing embodiments of our invention, it has been assumed that the comparisons of traces to determine their identity or lack of it are performed visually. This is a very effective way of performing the required comparisons, but they can also be done automatically and electrically in a manner such as is shown in Figure 8. In this figure, the shot point 11 and seismometer groups 15, 16, and 17 may be laid out in the same manner as shown in Figure 3. The $o$ seismometers of group 15 are connected together and to the input winding of a transformer 55 having a secondary winding 56 whose voltage is amplified by a first amplifier stage 57. This is followed by an automatic volume control amplifier channel 58 which actuates a galvanometer 59, recording trace #1 of the record. In a similar manner, the $x$ seismometers of group 15 are connected together and to an input transformer 61 having a secondary winding 62 feeding a first amplifier stage 63, followed by the A. V. C. channel amplifier 64, which drives galvanometer 65 to record trace #2.

In addition to the usual secondary windings, transformers 55 and 61 are respectively provided with an additional winding each, 66 and 67, which windings are connected in series opposition and to two control grids of a multigrid mixing tube 68, the center point between the two secondaries 66 and 67 being coupled to the cathode of tube 68. With this arrangement, the output of tube 68 is proportional to the difference of the voltages appearing across secondary windings 66 and 67, and this is amplified by an amplifier 69 driving a galvanometer 70 which records trace #3. Thus, traces #1 and #2 here correspond to traces #1 and #2 made by the recorder 12 in Figure 3, whereas trace #3 shows the instantaneous difference between these two traces. Inspection of trace #3 can thus supplement or replace the visual comparison of traces #1 and #2 and can be made quantitative to the extent that the degree of amplification of stage 68 and amplifier 69 is known or is controlled in a known way.

In an exactly similar way, the $o$ seismometers of group 16 are fed through a transformer 72 to the channel amplifier 73 and recorded by galvanometer 74 as record trace #4, while the $x$ seismometers of group 16 are coupled through the transformer 76 to the amplifier channel 77 which drives galvanometer 78 to form record trace #5. Likewise, the differential voltage of transformers 72 and 76 is applied to the input of a multigrid tube 80 feeding the difference voltage amplifier 81, the output of which is recorded by galvanometer 82 as trace #6. In the same way, the $o$ and $x$ seismometers of group 17 and their differential voltage are recorded as traces #7, #8, and #9 by galvanometers 84, 85, and 86 respectively.

Another application of our invention is in helping to determine the optimum depth of datum for shooting charges in a shot hole. Interlaced seismometer groups are laid out, either linear in pattern as in Figure 3, or areal as in Figure 4, and shots are fired at various depths in shot hole 11. A record is made for each shot in the same way as for determining seismometer saturations according to Figure 3 or 4.

Upon comparison, the records so made ordinarily exhibit differing degrees of saturation or identity of traces of interlaced seismometer groups. Particular attention is paid to the reflection energy, as the shot depth which produces maximum reflection energy saturation is usually the optimum. This is true provided the noise level of the different shots does not vary widely, since what is ultimately desired is the highest possible ratio of signal to noise. Occasionally, however, the noise level of a record showing high saturation for reflection energy may also be so high, or the noise may be of such a character, that a shot depth giving less than the maximum reflection saturation and less noise may be more favorable.

Figure 9:
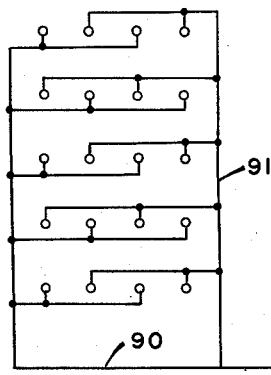
Figure 9 is a plan view of a seismometer arrangement utilizing the invention for quantitatively determining noise.

A further application of the principle of our invention is illustrated in Figure 9. It is sometimes desirable to study qualitatively or quantitatively the generation of noise by various methods of seismic wave initiation, or to ascertain the particular noise conditions or levels associated with a given test location or area. Alternate $o$ seismometers of a group, such as the areal group 25, are connected together in phase and to a lead 90. The remaining seismometers of the group are similarly connected together in phase and to a lead 91. Leads 90 and 91 are then coupled together out of phase and fed to trace #1 of the recorder 12.

On the assumption that the seismic reflection signals are in phase throughout the area covered by group 25, whereas the noise is random or statistical in phase and amplitude, then this interconnection of seismometers produces substantially complete cancellation of signals, leaving substantially pure random noise to be recorded. Of course, to the extent that the noise is systematic or non-random, but is in phase throughout the group area, cancellation will occur the same as for the desired signals. Nevertheless, an analysis of the random noise in this manner can sometimes lead to ways of reducing or eliminating it.

Thus, our invention may be broadly summarized as transmitting seismic waves from one location where they are generated to another location where they are received, while the conditions at one or the other of the two locations are held constant. The operative effects of one group of spaced points (shot holes or seismometers) at the location of variable conditions are compared against the operative effects of a second group of points, offset from the first group by about half the point spacing within the group, as an index of the effectiveness of the point spacing. While the invention has been illustrated with points uniformly spaced within each linear or areal group, it can, of course, be applied just as readily to patterns of variable point density, such as star or wheel-spoke patterns having greater point density near the pattern center.

Although we have thus described our invention in terms of the foregoing specific embodiments, it is to be understood that other and further modifications will be apparent to those skilled in this art. The invention therefore should not be considered as limited to the details set forth, but its scope is properly to be ascertained from the appended claims.

We claim:

1. In seismic geophysical surveying wherein seismic waves are generated at a first location adjacent the earth's surface and are received at a second location adjacent the earth's surface spaced at some distance from said first location, the method of determining whether a chosen arrangement of points at one of said locations has an optimum distribution which comprises the steps of producing a first record with a first group of said points in operation at said one of said locations, and producing a second record with a second group of said points in operation at said one of said locations, each point of said second group of points being offset from the corresponding point of said first group of points in a given direction by a distance which is about one-half the spacing between the points within each group, the conditions at the other of said locations being substantially the same for the producing of both said first and second records, whereby a comparison can be made of said records to ascertain by their substantial identity whether said distribution is optimum.

2. A method as in claim 1 wherein said record-producing steps comprise producing two electrical voltages, each representative of the seismic wave received at the second location with a different one of said first and second groups of points in operation at said one of said locations, and including the further steps of subtracting one of said voltages from the other, and recording as a function of time a visible oscillographic trace of the instantaneous values of the resultant differential voltage.

3. A method as in claim 1 wherein said one of said locations is said second location where seismic waves are received, said first and second groups of points in operation being seismometer groups covering about the same area of ground surface, said other location being said first location where seismic waves are generated, the conditions at said first location being kept substantially the same by generating the seismic waves received by both of said seismometer groups simultaneously at a single shot point.

4. A method as set forth in claim 1 wherein said one of said locations is said first location where seismic waves are generated, said first and second groups of points in operation being shot holes in two similar multiple-hole patterns, said other location being said second location where seismic waves are received, the conditions at said second location being kept substantially the same by receiving the seismic waves generated by said two multiple-hole patterns with the same seismometer spread.

5. Apparatus for seismic geophysical surveying comprising two groups of uniformly spaced seismometers covering about the same area of the ground surface, the spacing of the seismometers within each group being small compared to the linear dimensions of the group area, each seismometer unit of one group being offset in a given direction from the corresponding seismometer unit of the other group by about half the seismometer spacing within the group, the ground area covered by said two groups being separate from the ground area covered by any other seismometer group, and means for recording as records adapted for comparison with each other the two resultant outputs of said two seismometer groups.

6. Apparatus as in claim 5 including, in addition, means for recording as a separate record the difference in said two resultant group outputs.

7. Apparatus as in claim 5 wherein said two groups of seismometers cover only one of a plurality of group areas, each of which, except said one, is covered by a seismometer group of which the resultant output is adapted to be recorded as one of a plurality of record traces.

References Cited in the file of this patent
UNITED STATES PATENTS

| | | |
|---|---|---|
| 1,959,004 | Owen | May 15, 1934 |
| 2,087,702 | Peters | July 20, 1937 |
| 2,180,949 | Blau et al. | Nov. 21, 1939 |
| 2,305,383 | Hoover et al. | Dec. 15, 1942 |
| 2,615,523 | Poulter | Oct. 28, 1952 |